United States Patent [19]

Sawanobori et al.

[11] Patent Number: 5,777,670
[45] Date of Patent: Jul. 7, 1998

[54] DEVICE FOR CONTROLLING TRANSFER IN A CCD-TYPE IMAGING DEVICE

[75] Inventors: Keiji Sawanobori; Nobuhiro Tani, both of Tokyo, Japan

[73] Assignee: Asahi Kogaku Kogyo Kabushiki Kaisha, Tokyo, Japan

[21] Appl. No.: 527,435

[22] Filed: Sep. 13, 1995

Related U.S. Application Data

[63] Continuation of Ser. No. 140,418, Oct. 25, 1993, abandoned.

[30] Foreign Application Priority Data

Oct. 26, 1992 [JP] Japan .................... 4-311030

[51] Int. Cl.$^6$ .................................. H04N 5/335
[52] U.S. Cl. .......................... 348/311; 348/297
[58] Field of Search ........................ 348/241, 243, 348/248, 249, 250, 294, 295, 296, 297, 298, 311, 312, 314, 315, 362, 363, 364, 367; H04N 5/335

[56] References Cited

U.S. PATENT DOCUMENTS

| | | |
|---|---|---|
| 4,845,566 | 7/1989 | Sakai et al. |
| 4,868,667 | 9/1989 | Tani et al. |
| 5,036,397 | 7/1991 | Nagabusa . |
| 5,095,226 | 3/1992 | Tani . |
| 5,187,569 | 2/1993 | Tani . |
| 5,216,511 | 6/1993 | Tani .................... 348/234 |
| 5,251,036 | 10/1993 | Kawaoka et al. ............ 348/311 |
| 5,325,412 | 6/1994 | Stekelenburg ............ 348/314 |
| 5,477,265 | 12/1995 | Tani .................... 348/241 |

FOREIGN PATENT DOCUMENTS

60-174583  9/1985  Japan ............... H04N 5/335

*Primary Examiner*—Andrew Faile
*Assistant Examiner*—Tuan V. Ho
*Attorney, Agent, or Firm*—Greenblum & Bernstein, P.L.C.

[57] ABSTRACT

A device for controlling an imaging device, in which electric charges corresponding to an object are accumulated in photodiodes, and transferred through a vertical transfer CCD and a horizontal transfer CCD to be outputted from the imaging device. In a horizontal blanking period (an HD signal is "L"), $\overline{V1}$ through $\overline{V4}$ signals are changed in a predetermined order, so that the electric charges are transferred along the vertical transfer CCD. When the electric charges are transferred into the horizontal transfer CCD, the $\overline{V1}$ signal and the $\overline{V2}$ signal are set to "L". When an exposure is carried out, the V1 signal and the $\overline{V2}$ signal are set to "H", and the $\overline{V3}$ signal and the $\overline{V4}$ signal are changed in the same order as the vertical transfer operation, so that a charge pumping operation is carried out.

14 Claims, 4 Drawing Sheets

DEVICE FOR CONTROLLING TRANSFER IN A CCD-TYPE IMAGING DEVICE

This application is a continuation-in-part of application Ser. No. 08/140,418, filed Oct. 25, 1993, now abandoned.

BACKGROUND OF THE INVENTION

1. Field of the Invention

The present invention relates to a device for controlling an imaging device provided in a still-video camera to generate an image signal corresponding to an object.

2. Description of the Related Art

In a conventional still-video device, for example, a CCD (a charge coupled device, i.e., an imaging device) is provided for transforming an optical image, or an object obtained by an optical system, into an electronic image signal. The CCD has a matrix of photodiodes corresponding to the frame of the image, and electric charges generated in the photodiodes by exposure to light are transferred to a horizontal transfer CCD by vertical transfer CCDS, and thus an image signal is outputted from the horizontal transfer CCD. The vertical transfer CCDs always carry out a transfer operation, i.e., not only during an image signal output period, but also during an exposure period, and thus the control of the imaging device is simple.

During the exposure period, however, if the amount of light entering the photodiodes is excessive so that a surplus electric charge is generated in a photodiode, the electric charge flows into other, nearby, photodiodes directly or through the vertical transfer CCDS. The surplus electric charge causes blooming or smearing to occur, and thus, the electronic image to be deteriorated.

SUMMARY OF THE INVENTION

Therefore, an object of the present invention is to provide a device for controlling an imaging device, by which the surplus electric charge generated in a photodiode is prevented from flowing into the other photodiodes around the photodiode, so that an electronic image data of high accuracy is obtained.

According to the present invention, there is provided a device for controlling an imaging device having a light receiving part and a transfer part, the device comprising transferring means and control means. The transferring means transfers an electric charge accumulated in the light receiving part through the transfer part, in accordance with drive signals. The control means controls the transferring means in such a manner that some of the drive signals are fixed to predetermined values while an exposure on the light receiving part is carried out, whereby an accumulation area in which an electric charge can be accumulated is formed in the transfer part during the exposure.

Further, according to the present invention, there is provided a device for controlling an imaging device having a vertical transfer CCD and a horizontal transfer CCD, a plurality of electrodes being provided in the vertical transfer CCD, the device comprising control means and fixing means. The control means controls voltage levels at the electrodes and changes the voltage levels in a predetermined order, whereby a potential well in the vertical transfer CCD is moved therealong to transfer an electric charge in the vertical transfer CCD to the horizontal transfer CCD. The fixing means fixes the voltage level of some of the electrodes to a constant level for the exposure period, so that a potential well is not formed in a portion of the vertical transfer CCD corresponding to the electrodes that have been fixed by the fixing means.

Furthermore, according to the present invention, there is provided a device for controlling an imaging device having a vertical transfer CCD and a horizontal transfer CCD, a plurality of electrodes being connected to the vertical transfer CCD, the device comprising transferring means and setting means. The transferring means transfers electric charges from the vertical transfer CCD to the horizontal transfer CCD, the transferring means also changes the voltage level of the electrodes in a predetermined order, so that a potential well in the vertical transfer CCD is moved therealong. The setting means sets the voltage level of some of the electrodes to a constant level for the exposure period, so that a potential well is not formed in a portion of the vertical transfer CCD corresponding to the electrodes set by the setting means.

BRIEF DESCRIPTION OF THE DRAWINGS

The present invention will be better understood from the description of the preferred embodiments of the invention set forth below, together with the accompanying drawings, in which:

FIG. 5(a-f) is a diagram showing a charge pumping operation.

DESCRIPTION OF THE PREFERRED EMBODIMENTS

The present invention will now be described with reference to embodiments shown in the drawings.

Figure 1:
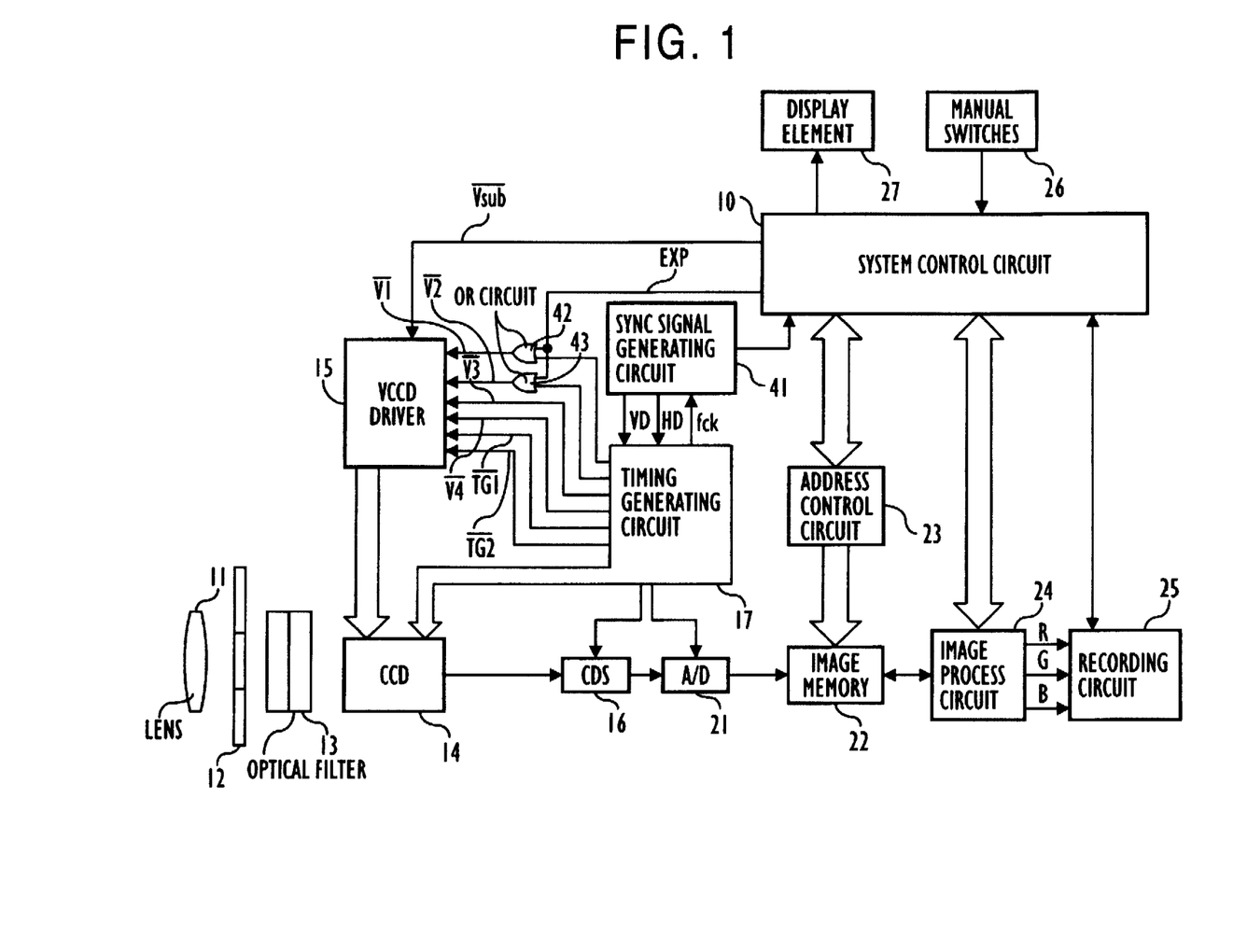
FIG. 1 is a block diagram showing a circuit of a still video camera to which an embodiment of the present invention is applied.

FIG. 1 is a block diagram showing a still video device having a device for controlling an imaging device of an embodiment of the present invention.

A system control circuit 10 is a microcomputer for controlling the still video device as a whole.

An imaging optical system has a lens 11, an aperture 12 and an optical filter 13. A beam passing through the imaging optical system is lead to a CCD 14, which is driven by a VCCD driver 15 and a timing generating circuit 17, so that an image signal corresponding to an object image formed on the CCD 14 is outputted from the CCD 14, and supplied to a correlation-double-sampling circuit (CDS) 16.

The image signal inputted to the CDS circuit 16 is processed so that reset noise is removed, and then subjected to a predetermined process, such as a gamma correction, in a pre-process circuit (not shown). Then, this image signal is converted to a digital signal by an A/D converter 21, and stored in an image memory 22. The addresses in the image memory 22 at which the image signal is stored are controlled by the system control circuit 10 and an address control circuit 23. Note, operations of the CDS circuit 16 and the A/D converter 21 are controlled by a signal pulse outputted from the timing generating circuit 17.

An image process circuit 24 is provided for applying a predetermined process to the image signal stored in the image memory 22, so that an R-signal, a G-signal and a B-signal are outputted. The R-signal, the G-signal and the B-signal are inputted to a recording device 25, and recorded on a recording medium, such as an IC-memory card.

Manual switches 26 are connected to the system control circuit 10 to operate the still video device, and a display element 27 is connected to the system control circuit 10 to indicate the operations to be performed as a result of the settings of the manual switches 26.

Figure 2:
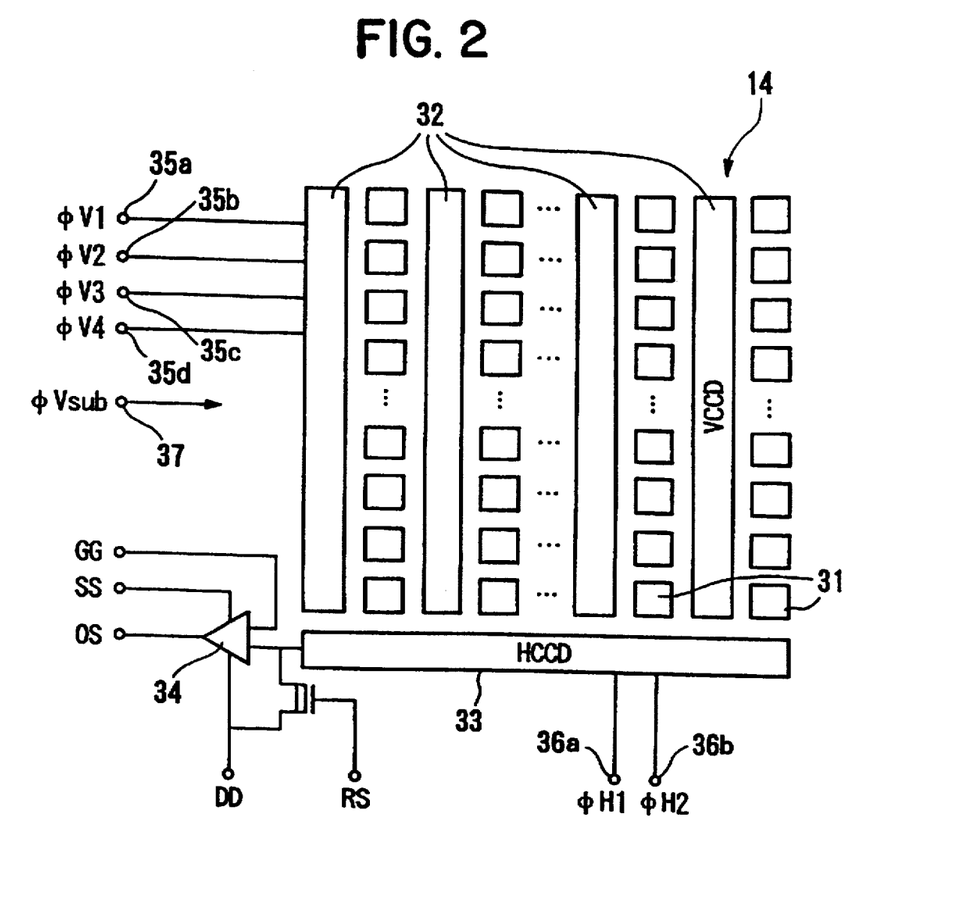
FIG. 2 is a diagram showing the arrangement of the elements in a CCD.

The construction of the CCD 14 and the components for driving the CCD 14 are described below with reference to FIGS. 1 and 2.

Photodiodes 31 are provided, and an electric charge is formed on the photodiode 31 in accordance with the amount of light entering thereinto. A vertical transfer CCD 32 is provided adjacent to the linear array of the photodiodes 31, and is extended in a vertical direction in the drawing. The vertical transfer CCD 32 transfers an electric charge generated at the photodiodes 31 to a horizontal transfer CCD 33. A floating diffusion amplifier (FDA) 34 is connected to the horizontal transfer CCD 33, and changes an electric charge transferred from the horizontal transfer CCD 33 to a voltage, and outputs this voltage to external circuits.

$\overline{V1}$, $\overline{V2}$, $\overline{V3}$ and $\overline{V4}$ signals are inputted into the VCCD driver 15 from the timing generating circuit 17, and a $\overline{V_{sub}}$ signal is inputted into the VCCD driver 15 from the system control circuit 10, so that signals having opposite polarities to these signals are outputted to the CCD 14 from the VCCD driver 15. For example, when the $\overline{V1}$, $\overline{V2}$, $\overline{V3}$ and $\overline{V4}$ signals are "L(low)", $\phi V_1$, $\phi V_2$, $\phi V_3$ and $\phi V_4$ signals are outputted as "H(high)". Similarly, regarding the $\overline{V_{sub}}$ signal, a $\phi V_{sub}$ signal having an opposite polarity to the $\overline{V_{sub}}$ signal is outputted. Note, in this embodiment, voltages of the $\overline{V1}$, $\overline{V2}$, $\overline{V3}$ and $\overline{V4}$ signals are 5V when "H", and are 0V when "L". Voltages of the $\phi V_1$, $\phi V_2$, $\phi V_3$ and $\phi V_4$ signals are 0V when "H" and are -7V when "L".

In a synchronizing signal generating circuit 41, a vertical synchronizing signal VD and a horizontal synchronizing signal HD are generated based on a clock signal f., outputted from the timing generating signal 17 under a control of the system control circuit 10. In the timing generating circuit 17, the $\overline{V1}$, $\overline{V2}$, $\overline{V3}$, $\overline{V4}$, $\overline{TG1}$ and $\overline{TG2}$ signals are generated based on the horizontal synchronizing signal HD, and are inputted into OR circuits 42, 43 or the VCCD driver 15.

Further, an EXP-signal indicating whether or not an exposure is being made is inputted into the OR circuit 42 in addition to the $\overline{V1}$ signal. The EXP-signal is "H" during the exposure period, and "L"at other times. The OR circuit 42 outputs the $\overline{V1}$ signal inputted from the timing generating circuit 17, as it is, when the EXP-signal is "L", and outputs the $\overline{V1}$ signal as "H" when the EXP-signal is "H". Similarly, the OR circuit 43 outputs the $\overline{V2}$ signal inputted from the timing generating circuit 17, as it is, when the EXP-signal is "L", and outputs the $\overline{V2}$ signal as"H" when the EXP-signal is "H".

The $\phi V_1$ through $\phi V_4$, signals are transfer control signals by which electric charges on the photodiodes are transferred along the vertical transfer CCD. The $\overline{TG1}$ signal and the $\overline{TG2}$ signal are timing control signals by which electric charges on the photodiodes corresponding to a first field and a second field, respectively, are transferred to the vertical transfer CCD.

In the CCD 14, the transfer of electric charges from the photodiodes to the vertical transfer CCD, and the vertical transfer of electric charges in the vertical transfer CCD, are carried out by a drive signal outputted by the VCCD driver 15, and the horizontal transfer is carried out by a drive signal outputted by the timing generating circuit 17. Namely, electric charges are transferred from the photodiodes to vertical transfer CCDs 32 and vertically transferred in the vertical transfer CCDs 32, in accordance with the 4-phase $\phi V_1$ through $\phi V_4$ signals (the drive signal) supplied, through terminals 35a through 35d, by the VCCD driver 15. Further, the electric charges are horizontally transferred in the horizontal transfer CCD 33, in accordance with the $\phi H_1$ and $\phi H_2$ signals supplied, through terminals 36a and 36b, by the timing generating circuit 17. The $\phi V_{sub}$ signal supplied, through a terminal 37, by the VCCD driver 15 is provided for discharging residual electric charges accumulated in the CCD 14 to the substrate of the CCD 14 just before an exposure period. By these signals, operations such as transferring the electric charges, accumulating of electric charges, determination of the electronic shutter speed, and discharging the residual electric charges, are carried out.

Figure 3:
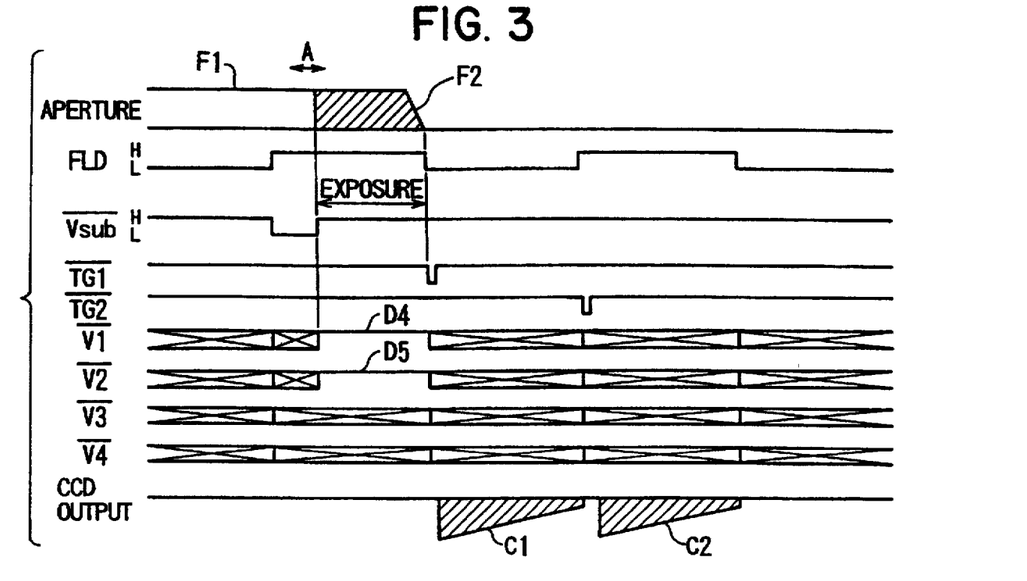
FIG. 3 is a timing chart showing an operation of the CCD.
Figure 4:
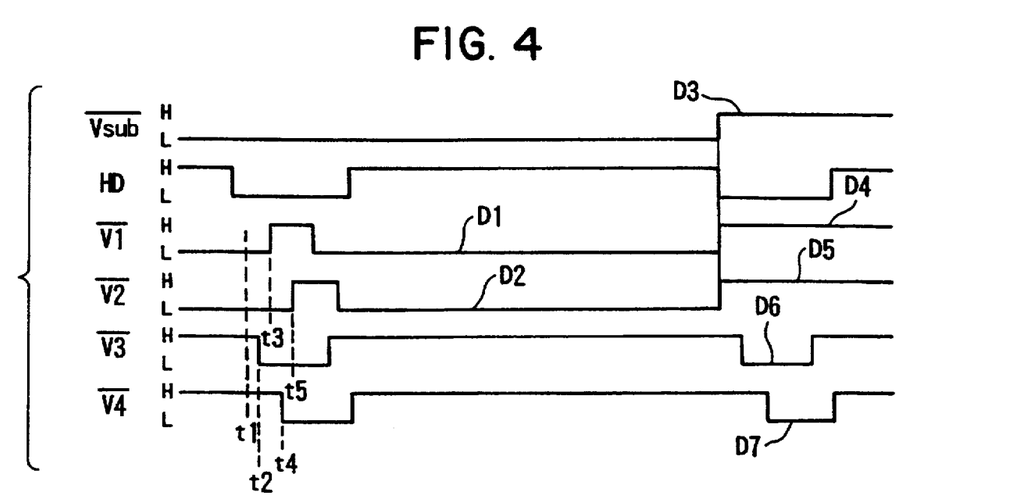
FIG. 4 is a timing chart showing a period shown by the reference A in FIG. 3 enlarged in a time-axis direction.

FIGS. 3 and 4 are timing charts showing operations by which an image signal detected by the CCD 14 is outputted from the CCD 14. Note, FIG. 4 is obtained by enlarging the period shown by the reference A in a time axis direction (horizontal direction in the drawing).

In FIG. 3, before the exposure period, the aperture 12 is open (the reference F1). An FLD-signal indicates the image field, and is switched to "H" or "L" in accordance with the field. Namely, the FLD-signal is "H" for the first field, and "L" for the second field.

The $\overline{V_{sub}}$ signal is usually "H", and becomes "L" at a predetermined timing based on the operation of a release switch (not shown) included in the manual switches 26. When the $\overline{V_{sub}}$ signal becomes "L", namely when $\phi V_{sub}$ signal (see FIG. 2) becomes "H", residual electric charges which have accumulated in the photodiodes 31 are discharged to the substrate of the CCD 14. Since all of the residual electric charges generated in the photodiodes are discharged to the substrate by the discharge operation, electric charges due to the object image start to accumulate in the photodiodes when the discharge operation is completed. Then, when the aperture 12 is closed (the reference F2), the exposure is completed. The exposure period is from the time when discharge of the residual electric charges is completed to the time when the aperture 12 is closed. The electric charges corresponding to the object are accumulated in the photodiodes 31 of the CCD 14, during the exposure period.

The $\overline{V1}$ through $\overline{V4}$ signals repeatedly change to "ON" and "OFF" at a predetermined timing, except that the $\overline{V1}$ and $\overline{V2}$ signals are fixed to "H" during the exposure period (the references D4 and D5). In other words, the $\phi V_1$ through $\phi V_4$ signals applied to first through fourth electrodes of the vertical transfer CCD 32 repeatedly change from "H" to "L", or from "L" to "H", at a predetermined timing. The $\phi V_1$ through $\phi V_4$ signals are the drive signals for carrying out the vertical transfer of the electric charges in the vertical transfer CCD 32, and the vertical transfer is always carried out even when it does not need to be carried out. Due to such an operation, the circuit provided for controlling the CCD 14 can be simplified. The operation in which the $\overline{V1}$ and $\overline{V2}$ signals are fixed at "H" in the exposure period is described later.

When the exposure period ends, the $\overline{TG1}$ signal is outputted just after the FLD-signal changes from "H" to "L", so that a voltage or approximately +15 V is applied to the CCD 14 as the $\phi V_1$ signal, and thus the electric charges accumulated in the photodiodes 31 and corresponding to the image of the first field are transferred to the vertical transfer CCD 32. Then, the electric charges on every alternate photodiode are transferred toward the horizontal transfer CCD 33 due to the operation of the $\overline{V1}$ through $\overline{V4}$ signals, i.e., the $\phi V_1$ through $\phi V_4$ signals (FIG. 2), and the signals of one horizontal scanning line existing in the horizontal transfer CCD 33 are transferred to the FDA 34 (FIG. 2) by operation of the $\phi H_1$ and $\phi H_2$ (FIG. 2). Thus, the image signal of the first field is outputted from the CCD 14 as one horizontal scanning line after another horizontal scanning line (reference C1).

Then, the $\overline{TG2}$ signal is outputted just after the FLD-signal is charged from "L" to "H", so that a voltage of approximately +15 V is applied to the CCD 14 as the $\phi V_2$ signal, and thus the electric charges accumulated in the photodiodes 31 and corresponding to the second field are transferred to the vertical transfer CCD 32. Then, similarly to the first field, the image signal of the second field is outputted from the CCD 14 as one horizontal scanning line after another horizontal scanning line (reference C2), through the vertical transfer CCD 32, the horizontal transfer CCD 33 and the FDA 34. Since the electric charges in the photodiodes are transferred to the vertical transfer CCD 32 by the $\overline{TG1}$ and $\overline{TG2}$ signals after the aperture 12 is completely closed, smearing is prevented.

FIG. 4, the period when the HD signal is "L" is a blanking period when no image signal is outputted from the CCD 14. In the blanking period, the $\overline{V1}$ through $\overline{V4}$ signals are continuousely changed, so that a vertical transfer of electric charges is carried out. Namely, the $\overline{V1}$ signal and the $\overline{V2}$ signal are "L" (=0 V) at time t1, and the $\overline{V3}$ signal becomes "L" at time t2. Then, the $\overline{V1}$ signal is changed to "H" (=5 V) at time t3, the $\overline{V4}$ signal is changed to "L" at time t4, and the $\overline{V2}$ signal is changed to "H" at time t5. Thus, in the blanking period, the "L" state of each signal is repeatedly changed, so that voltage levels of the first through fourth electrodes connected to the vertical transfer CCD 32 are repeatedly changed to "H" (=0 V). Accordingly, potential wells in the vertical transfer CCD 32 are moved to the horizontal transfer CCD 33, so that electric charges are transferred to the horizontal transfer CCD 33.

After each vertical transfer operation, the HD signal is changed to "H", and thus a horizontal transfer period is provided. In this horizontal transfer period, horizontal transfer of electric charges is carried out in the horizontal transfer CCD 33 by the $\phi H_1$ and $\phi H_2$ signals, so that the image signal is outputted from the CCD 14. In the horizontal transfer period, the $\overline{V1}$ and $\overline{V2}$ signals are "L" (=$\phi V$) as shown by the references D1 and D2, namely, the $\phi V_1$ and $\phi V_2$ signals are "H" (=$\phi V$). Therefore, potential wells are formed in those portions of the vertical transfer CCD 32 corresponding to the electrodes to which the $\phi V_1$ and $\phi V_2$ signals are applied. In a usual monitoring mode (the state before an exposure operation is carried out to record an image on a recording medium), electric charges of a previous field of the image to be recorded are held in the potential wells. In a still-image recording mode, electric charges outputted from the photodiodes are held by the potential wells after the exposure is completed.

While the vertical transfer operation and the horizontal transfer operation are repeated, the $\overline{V_{sub}}$ signal is changed to "L", so that residual electric charges are discharged, and then the $\overline{V_{sub}}$ signal is changed to "H", so that an exposure is started. During the exposure period, the $\overline{V1}$ signal and the $\overline{V2}$ signal are fixed at the "H" as shown by the references D4 and D5. Namely, the voltage levels at the electrodes to which the $\phi V_1$ signal and the $\phi V_2$ signal are supplied are fixed at "L" (=−7 V), so that potential wells are not formed in portions of the vertical transfer CCD 32 corresponding to the electrodes. Accordingly, residual electric charges do not flow from the photodiodes into those portions of the vertical transfer CCD 32, and are lead to portions of the vertical transfer CCD 32 corresponding to the electrodes to which the $\phi V_3$ signal and the $\phi V_4$ signal are supplied. Further, during the exposure period, the $\overline{V3}$ signal the $\overline{V4}$ signal, i.e., the $\phi V_3$ signal and the $\phi V_4$ signal are repeatedly changed between "ON" and "OFF" states similarly to the usual operation (the references D6 and D7). As a result, a charge pumping effect occurs in the vertical transfer CCD 32, and thus the residual electric charges disappear, as described below.

FIG. 5 shows the operation of the vertical transfer CCD 32 during the exposure period, i.e., during the charge pumping operation by the third and fourth electrodes.

Figure 5A:
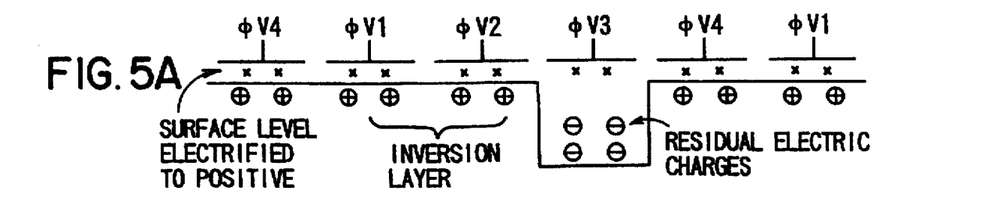
Figure 5B:
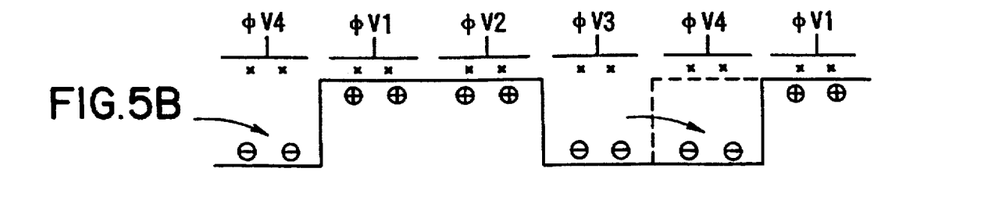
Figure 5C:
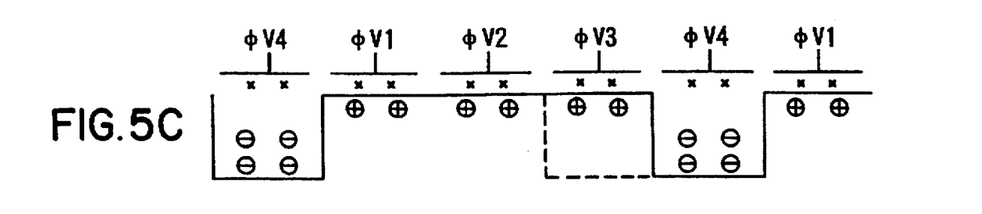
Figure 5D:
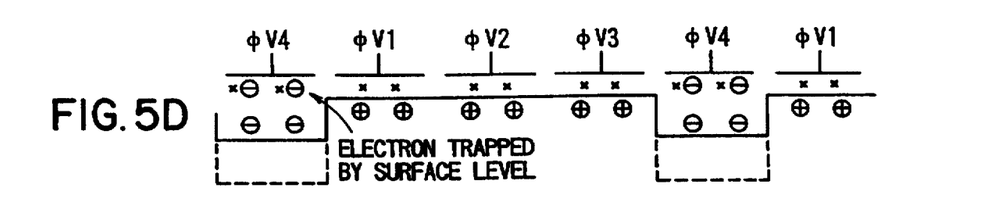
Figure 5E:
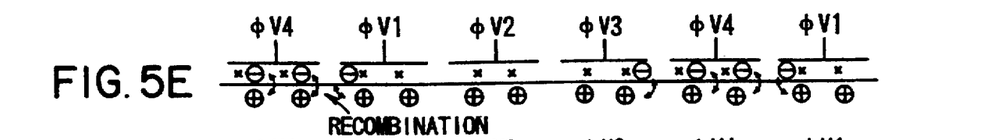
Figure 5F:
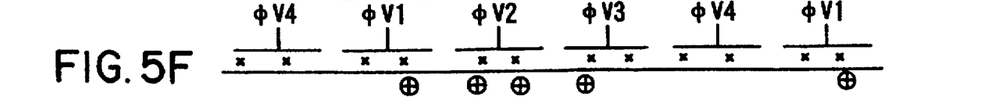

During the exposure period, the voltages applied to the first and second electrodes, i.e., the $\phi V_1$ signal and the $\phi V_2$ signal are always "L" (=−7 V), and therefore potential wells are not formed in portions corresponding to the electrodes.

At the interface of the CCD, since a donor-impurity exists, a surface level electrified to positive (shown by the reference x) is always formed. Therefore, if an electron exists adjacent to the interface, the electron is trapped by the surface level. Namely, the electron is not stuck on the interface.

In the state shown by the reference (a), a voltage "H" (=$\phi V$) is applied only to the third electrode, and therefore, a potential well is formed only in the portion corresponding to the electrode, and residual electric charges (four electrons are shown in FIG. 5) flowing out of a photodiode are held in the potential well. Since a voltage "L" (=−7 V) is applied to the first, second and fourth electrodes, a potential well is not formed in the portions corresponding to the electrodes. An inversion layer is formed on the interface corresponding to the electrodes to which the negative voltage (=−7 V) is applied, and holes gather on the interface.

Then, in the state shown by the reference (b), a potential well is formed in a portion corresponding to the fourth electrode, and this potential well is connected to the potential well corresponding to the third electrode. Therefore, some of the electrons held in the potential well corresponding to the third electrode in the state (a) are moved to the potential well corresponding to the fourth electrode.

After that, as shown by the reference (c), the voltage of the third electrode, i.e., the $\phi V_3$ signal is changed to "L" (=−7 V), so that the potential well corresponding to the electrode disappears. Accordingly, the potential well exists only in the portion corresponding to the fourth electrode, the electrons are held in that potential well.

Then, the $\phi V_4$ signal is changed to "L" (=−7 V), and thus the potential well corresponding to the fourth electrode disappears. Right before the disappearance of the potential well, some of the electrons which have been held in the potential well are trapped by the surface level existing on the interface adjacent to the fourth electrode, as shown by the reference (d). When the potential well completely disappears, as shown by the reference (e), since holes are generated on the interface, the hole and the electrons trapped by the surface level recombine. The electrons, which were not trapped by the surface level of the fourth electrode in the state (d), are trapped by the surface level existing on the interface adjacent to the first or third electrode in the state (e), and recombine with holes existing at the interface. By such a recombination, the unnecessary electrons disappear as shown by the reference (f).

By the variations of the voltages applied to the electrodes, i.e., by the charge pumping operation, the residual electric charges flowing into the vertical transfer CCD 32 recombine with the holes generated at the time of formation of the potential wells and disappear.

As described above, the embodiment is constructed in such a manner that, in during the exposure period, the voltage levels at the first and second electrodes are fixed at "L" (=−7 V) so that a potential well is not formed in each of the portions corresponding to the electrodes, and the vertical transfer operations of the third and fourth electrodes continue. Therefore, a barrier is formed so that a leakage of the residual electric charges from the photodiodes into the vertical transfer CCD 32 is prevented, and the residual electric charges flowing into the portions corresponding to the third and fourth electrodes from the photodiodes disappear due to the charge pumping operation which is carried out by changing the voltage applied to the third and fourth electrodes. Therefore, even when residual electric charges are generated in the photodiodes during the exposure period, the electric charges do not flow into other nearby photodiodes through the vertical transfer CCD. Accordingly, the image data is not deteriorated and a high quality image is obtained.

Further, the embodiment is constructed without major changes to the circuit, namely only the OR circuits 42 and 43 are provided so that the $\overline{V1}$ signal and the $\overline{V2}$ signal are fixed to "H" during the exposure period, and therefore, by a compact and simple circuit, the residual electric charges generated in the photodiodes cannot flow from one photodiode into nearby photodiodes.

Note, the voltages of electrodes (the third and fourth electrodes in the above embodiment) in which voltage levels are set to "L" during the horizontal transfer period may be fixed to "L" during the exposure period so that the residual electric charges disappear.

Further note, the species of electrodes in the vertical transfer CCD in which the voltages are fixed at "L" in the exposure period is not necessarily two, and may be one or three. Namely, when the vertical transfer CCD is driven in an N-phase drive mode, the number "n" of the species of electrodes in which the voltages are fixed is as follows. Namely, $$1 \leq n \leq N-1$$

Still further, the present invention is not restricted to the 4-phase drive vertical transfer CCD as in the above embodiment, and can be applied to a 2-phase or a 3-phase drive vertical transfer CCD.

Although the embodiments of the present invention have been described herein with reference to the accompanying drawings, obviously many modifications and changes may be made by those skilled in this art without departing from the scope of the invention.

We claim:

1. A device for controlling an imaging device for a still video camera having an aperture, said imaging device having a light receiving part and a transfer part, comprising:

means for transferring an electric charge accumulated in said light receiving part through said transfer part, in accordance with drive signals;

means for controlling said transferring means for fixing some of the drive signals at predetermined voltage values, with the remainder of the drive signals comprising variable voltage drive signals, while an entire exposure period on said light receiving part is carried out, said entire exposure period extending from a discharge of residual electric charges from said light receiving part to a closure of said aperture, to form an accumulation area in which an electric charge can be accumulated in said transfer part during said exposure, wherein a residual part of the accumulated electric charge is transferred in a similar manner to the transfer of the accumulated electric charge by said means for transferring.

2. A device according to claim 1, wherein said transfer part comprises a CCD; the drive signals change potential wells of portions of said transfer part corresponding to two of said electrodes which are adjacent one another, to which the drive signals are applied, to transfer the electric charge accumulated in said accumulation area; portions of said transfer part adjacent opposite sides of said two adjacent electrodes, corresponding to the fixed drive signals, comprise areas in which a potential well is not formed and an electric charge cannot be accumulated;

and the residual portion of said transfer part corresponding to the non-fixed drive signals is defined as said accumulation area.

3. A device according to claim 2, wherein said control means carries out a charge pumping operation for said accumulation area by varying the voltage levels of the variable drive signals to cause said electric charge accumulated in said accumulation area to disappear.

4. A device according to claim 1, wherein the number of said fixed drive signals is more than one, electrodes to which said fixed drive signals are applied are provided in such a manner that said electrodes are adjacent each other along a direction in which said electric charge is transferred.

5. A device for controlling an imaging device having a vertical transfer CCD and a horizontal transfer CCD, a plurality of electrodes being provided in said vertical transfer CCD, said device comprising:

means for controlling the voltage levels of said electrodes to change said voltage levels in a predetermined order, to move a potential well of said vertical transfer CCD therealong to transfer an electric charge in said vertical transfer CCD to said horizontal transfer CCD; and means for fixing a voltage level of some of said electrodes to a constant level during an exposure period, so that a potential well is not formed in a portion of said vertical transfer CCD corresponding to said some electrodes fixed at a constant level; wherein said fixing means comprises:

a timing generating circuit outputting a control signal at a predetermined time;

a system control circuit outputting an EXP-signal indicating said exposure period; and an OR circuit into which said control signal and said EXP-signal are inputted, said OR circuit outputting said control signal as it is, to said control means to transfer said electric charge in said vertical transfer CCD when said EXP-signal has a first level, said OR circuit outputting a constant level signal to said control means to change a part of said electrodes to generate a charge Dumping effect in said vertical transfer CCD when said EXP-signal has a second level different from said first level.

6. A device according to claim 5, wherein said fixing means fixes said voltage level to a low level during said exposure period.

7. A device according to claim 5, wherein, during a horizontal transfer period, a potential well is formed in said portion of said vertical transfer CCD where a potential well is not formed during said exposure period.

8. A device according to claim 7, wherein a voltage level of said electrode corresponding to said portion, in which a potential well is not formed for said exposure period, is set to a high level for said horizontal transfer period.

9. A device according to claim 5, wherein said control means changes the voltage level of electrodes at which the voltage level is not fixed to a constant level by said fixing means, during said exposure period.

10. A device for controlling an imaging device for a still video camera having an aperture, said imaging device having a vertical transfer CCD and a horizontal transfer CCD, a plurality of electrodes being connected to said vertical transfer CCD, said device comprising:

means for transferring electric charge in said vertical transfer CCD to said horizontal transfer CCD, said transferring means changing the voltage level of said electrodes in a predetermined order, so that a potential well in said vertical transfer CCD is moved therealong; and means for setting the voltage level of some of said electrodes to a constant level during an entire exposure period, said entire exposure period extending from a discharge of residual electric charges from said vertical transfer CCD to a closure of said aperture, so that a potential well is not formed in a portion of said vertical transfer CCD corresponding to said some of said electrodes;

wherein said transferring means changes the voltage level of said electrodes other than said some of said electrodes in the same predetermined order, relative to one another, whether during an exposure period or outside of an exposure period.

11. A device for controlling an imaging device having a vertical transfer CCD and a horizontal transfer CCD, a plurality of electrodes being provided in said vertical transfer CCD, said device comprising:

means for controlling voltage levels of said electrodes to change said voltage levels in a predetermined order to move a potential well along said vertical transfer CCD to transfer an electric charge in said vertical transfer CCD to said horizontal transfer CCD; and means for fixing voltage levels of two of said electrodes which are adjacent one another, to a constant voltage level during an entire exposure period, so that a potential well formation is prevented in a portion of said vertical CCD corresponding to said adjacent electrodes fixed at a constant voltage level.

12. A device according to claim 11, wherein said constant voltage level to which said two of said electrodes which are adjacent one another is set during an entire exposure period is a low level.

13. A device for controlling an imaging device for a still video camera having an aperture, said imaging device having a vertical transfer CCD and a horizontal transfer CCD, a plurality of electrodes being provided in said vertical transfer CCD, said device comprising:

means for controlling voltage levels of said electrodes to change said voltage levels in a predetermined order to move a potential well along said vertical transfer CCD to transfer an electric charge in said vertical transfer CCD to said horizontal transfer CCD; and means for fixing a voltage level of at least one of said electrodes to a constant voltage level during an entire exposure period, said entire exposure period extending from a discharge of residual electric charges from said vertical transfer CCD to a closure of said aperture, so that a potential well formation is prevented in a portion of said vertical CCD corresponding to at least one of said electrodes, wherein said controlling means changes the voltage level of said electrodes other than said at least one of said electrodes in the same predetermined order, relative to one another, whether during an exposure period or outside of an exposure period.

14. A device according to claim 13, wherein said means for fixing a voltage level of at least one of said electrodes to a constant voltage level during an entire exposure period fix voltage levels of two of said electrodes which are adjacent one another, so that a potential well formation is prevented in a portion of said vertical CCD corresponding to said two of said electrodes.

* * * * *

UNITED STATES PATENT AND TRADEMARK OFFICE
CERTIFICATE OF CORRECTION

PATENT NO.   : 5,777,670
DATED        : July 7, 1998
INVENTOR(S)  : K. SAWANOBORI et al.

It is certified that error appears in the above-identified patent and that said Letters Patent is hereby corrected as shown below:

At column 8, line 54 (claim 5, line 27) of the printed patent, change "Dumping" to ---pumping---.

At column 8, line 58 (claim 6, line 2) of the printed patent, change "said" to ---the---.

Signed and Sealed this

Twenty-third Day of March, 1999

Attest:

Q. TODD DICKINSON

Attesting Officer       Acting Commissioner of Patents and Trademarks